United States Patent [19]

Roy

[11] Patent Number: 4,561,312
[45] Date of Patent: Dec. 31, 1985

[54] TURBINE FOR A MULTIJET LIQUID FLOW METER

[75] Inventor: Daniel Roy, St. Louis, France

[73] Assignee: Sappel, St. Louis, France

[21] Appl. No.: 554,383

[22] Filed: Nov. 22, 1983

[30] Foreign Application Priority Data

Dec. 10, 1982 [FR] France ............................ 82 20696
Jun. 7, 1983 [FR] France ............................ 82 09396

[51] Int. Cl.⁴ .................................................. G01F 1/08
[52] U.S. Cl. .............................. 73/861.81; 73/861.33; 73/861.79
[58] Field of Search ........... 73/861.33, 861.79, 861.87, 73/861.88, 253, 254, 259, 260

[56] References Cited

U.S. PATENT DOCUMENTS

| | | | |
|---|---|---|---|
| 141,325 | 7/1873 | Cook | 73/861.79 |
| 470,033 | 3/1892 | Beckmann | 73/861.33 |
| 630,441 | 8/1899 | Beckmann | 73/861.79 X |
| 3,091,118 | 5/1963 | Hubbard | 73/861.87 X |
| 4,131,017 | 12/1978 | Back | 73/861.79 |
| 4,389,902 | 6/1983 | Kataoka et al. | 73/861.87 X |

Primary Examiner—Herbert Goldstein
Attorney, Agent, or Firm—Browdy and Neimark

[57] ABSTRACT

A turbine for a multijet fluid flow meter having a planar disk mounted for rotation in the meter housing includes a plurality of vertical blades supported normal to, and by, the disk. A ribbed shaft carried by the disk drives a counter. The disk may include braking ribs on the upper or lower surface for slowing rotation of the disk when subjected to strong fluid flows. Various blade configurations are contemplated, and the turbine may additionally take the form of a duality of parallel disks interconnected by a plurality of blades normal to both disks.

8 Claims, 19 Drawing Figures

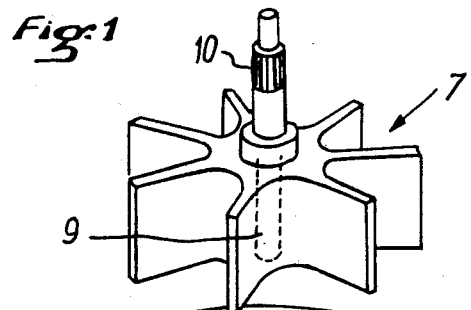
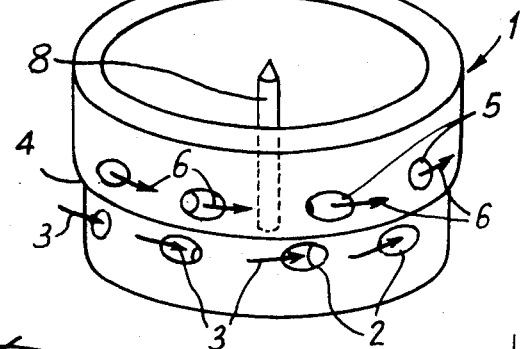
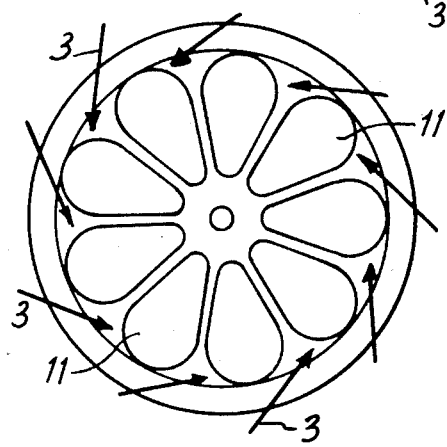
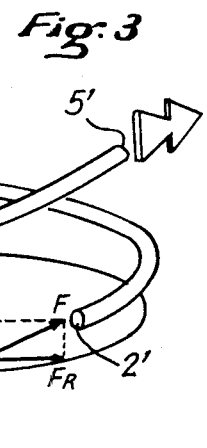
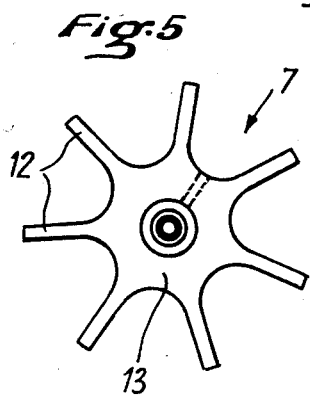
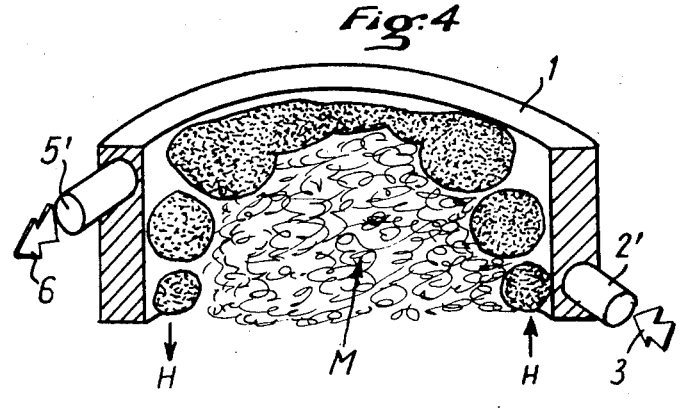

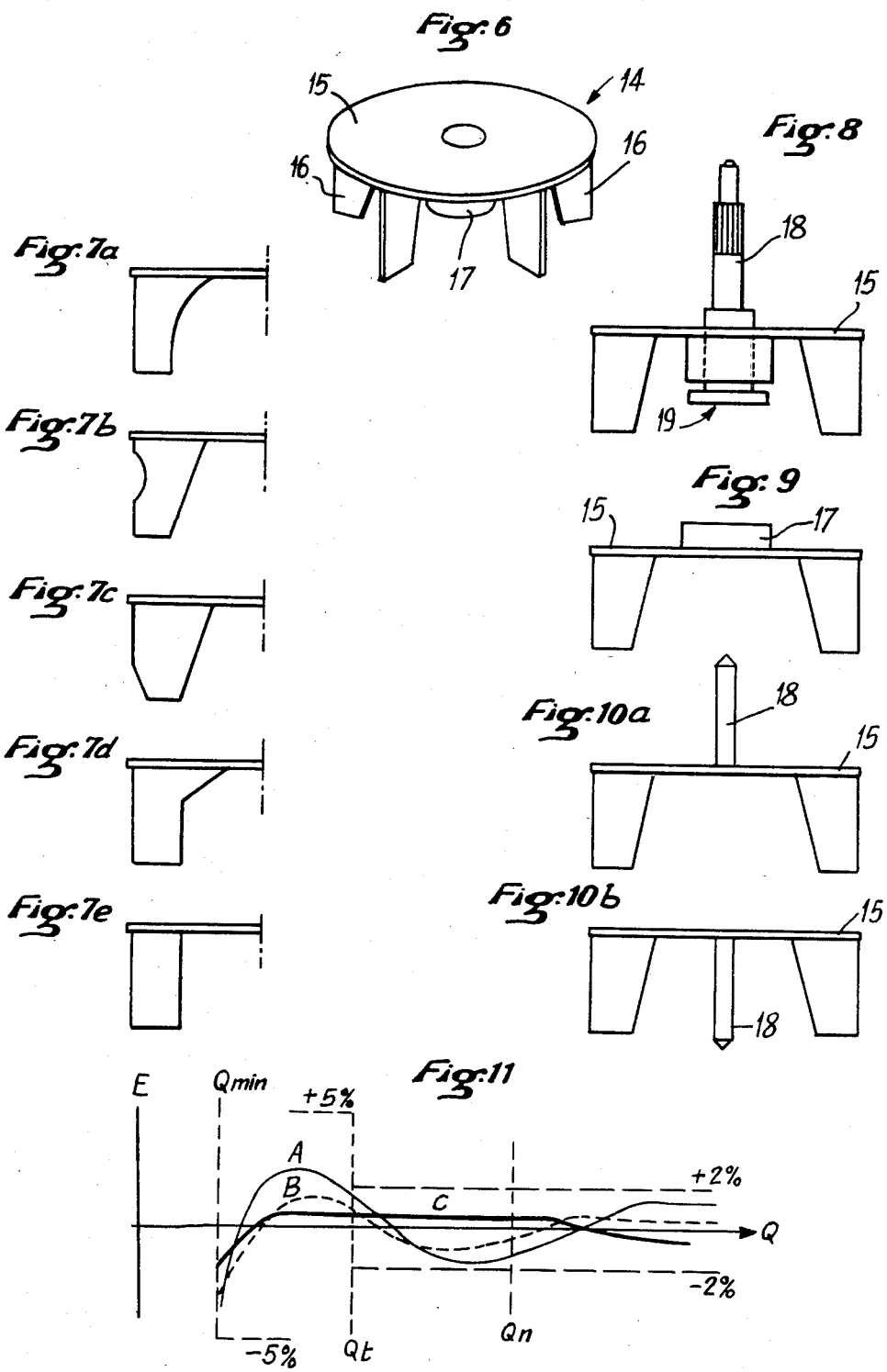

TURBINE FOR A MULTIJET LIQUID FLOW METER

BACKGROUND OF THE INVENTION

This invention relates to the field of devices intended to measure the delivery and/or the rate of flow of a liquid. In particular, it relates to a new multi-jet turbine adapted to be used with a meter for liquids, such as water.

Water meters known as "first connection" meters for example, those installed at the base of a building, can be classified in two main groups: volumetric meters which typically employ a piston, oscillating disk or revolving cylinder type; and rotary speed meters in which water passing through the meter causes rotation of an enclosed rotary device and the column of the passing water is measured from the number of revolutions made by the rotary device. The latter can be of either the single jet type, as for example a millwheel in the water, or of the multi-jet type in which a turbine or rotor disposed in a cylindrical distributor pierced with two superposed rows of inlet or outlet holes, is rotatable driven so that its rotation causes movement of a revolving needle or numbered roller counter for measuring the delivered fluid.

More specifically, the invention is a multi-jet device of this type and comprises an improvement in the system of the turbine.

SUMMARY AND OBJECTS OF THE INVENTION

One of the main objects of the invention is therefore to eliminate the drawbacks of the conventional turbine and to provide distributor systems that enables hydraulic division and equilibrium of the fluid without disturbance so as practically to attain ideal circulation and metering conditions of the fluid.

Another object is to provide a rotor with a lightened structure, immediately adaptable to distributor housings of said type having a design making it possible to achieve fluid meters, particularly water meters, with great reliability.

According to the invention, the new turbine is essentially characterized by a series of vertical blades, oriented concentrically to the shaft of the turbine which are all connected by their upper end to a thin horizontal disk having a central perforated part functioning as a guide for a ribbed or splined rod for connection to the counter, known in the art, of the meter.

Thus, in this new rotor design adapted to a standard distributor housing, the turbine central part that disturbs the hydraulic equilibrium is totally eliminated, the zone of centrally located swirling fluid, present in conventional distributors, is no longer isolated from the spiral of circulation of flow, and mixing of liquid currents is performed homogeneously, without disordered turbulence or tumultuous interaction of the jets of flow.

Moreover, the turbine of the present invention exhibits other advantages. For example, the presence of the disk connecting the blades, which offers a large surface for the action of the drive flow, appreciably facilitates the rise of the turbine under the action of forces which impart motion to the turbine. The disk, which produces a centrifugal force, exhibits the advantages of protecting the element or rod connecting the counting system of the meter. These elements previously have exhibited frequent clogging for example, by magnetic particles with counters of the magnet type, or by premature wearing via sandy grains with rods of the gear type.

Of course, because the turbine of the present invention does not change the hydraulic structure of the flow, it is possible to realize all of its advantages by changing in various ways the shape of the blades to benefit as much as possible from all the types of movements of the liquid.

BRIEF DESCRIPTION OF THE INVENTION

To better understand the development of the inventive idea and the advantage of the improvements made, a detailed description of the invention will follow with reference to the various figures of the drawings, in which:

FIG. 1 is a perspective view of a conventional distributor and its turbine;

FIG. 2 is a top view of the bottom section of the distributor with a representation of the orientations of the input liquid flow;

FIG. 3 depicts the flow pattern of a liquid jet within the distributor during rotation of the turbine;

FIG. 4 is a partially sectioned view of the distributor illustrating the flow within various parts;

FIG. 5 is a top view of a conventional turbine;

FIG. 6 is a perspective view of a turbine according to the present invention;

FIG. 7a illustrates a first variation on the configuration of the turbine blade shown in FIG. 6;

FIG. 7b illustrates a second variation of the turbine blade configuration;

FIG. 7c illustrates a third variation of the turbine blade configuration;

FIG. 7d illustrates a fourth variation of the turbine blade configuration;

FIG. 7e illustrates a fifth variation of the turbine blade configuration;

FIG. 8 is a side elevational view of one embodiment of the turbine of FIG. 6 including a connecting rod mounted thereon;

FIG. 9 is a side elevational view of a second embodiment of the turbine of FIG. 6 illustrating an alternative location of the bearing collar for a connecting rod;

FIG. 10a is a side elevational view of one embodiment the turbine of present invention having an integrally mounted connecting rod;

FIG. 10b is a side elevational view of an alternative embodiment of the turbine of FIG. 10a;

FIG. 11 is a graph illustrating characteristics of fluid flow in various multi-jet flow meters;

DETAILED DESCRIPTION OF THE INVENTION

Figure 12:
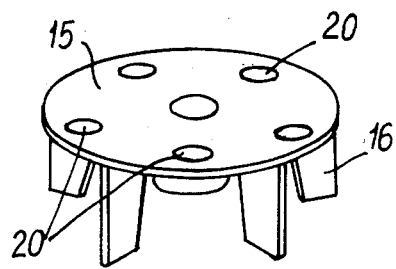
FIG. 12 is a perspective view of a variant turbine according to the present invention.
Figure 13:
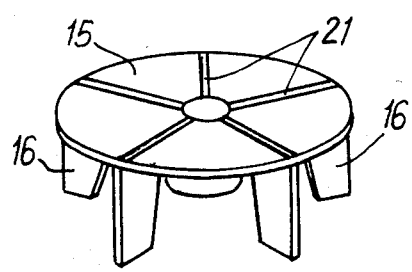
FIG. 13 is a perspective view of another variant turbine according to the present invention.
Figure 14:
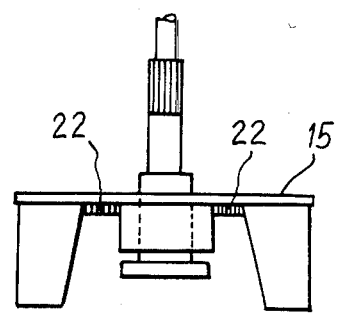
FIG. 14 is a side elevational view of yet another variant turbine according to the present invention.

Referring now to FIGS. 1–5 of the drawings, there is shown a conventional multi-jet liquid flow meter including a hollow cylindrical distributor 1 provided with circumferentially disposed, substantially tangentially directed holes or openings. These openings are arranged in the lower portion of the housing side wall in a first array and in the upper portion of the side wall in a second array, and the openings 2 of the first array are directed tangentially inwardly from the distributor outer surface to produce an input fluid flow, while the openings 5 are directed tangentially outwardly from the distributor inner surface to produce an output fluid flow. The first array of openings 2 facilitates introduction or induction of a fluid into housing 1 in a circulatory pattern as shown by arrows 3, and the second array of openings 5 facilitates evacuation or expulsion of the fluid from the housing (to the outlet opening of the meter) in a circulatory pattern as shown by arrows 6. A turbine 7 is mounted within the housing interior on a centrally disposed lug 8, the latter being engaged in a hollow shaft 9 of the turbine. An upwardly projecting ribbed or splined rod 10 is carried by the turbine for connection to the counter of the meter guage.

The flow 3 of input fluid, which rotatively drives turbine 7, follows a spiral course (see FIG. 3) from inlet openings 2' to outlet openings 5'. This spiralling flow imparts a force F to turbine 7 which has components $F_R$ (drives the turbine in rotation) and $F_A$ (imparts an upward movement to the turbine). Force $F_A$, smaller in magnitude than force $F_R$, overcomes the influence of gravitational forces on the turbine to cancel frictional forces which tend to reduce $F_R$ at small delivery rates.

At turbulent speed, force $F_R$ is approximately proportional to the square of the delivery of the input flow into the distributor. To obtain a turbine rotation speed perfectly proportional to the rate of flow—a requisite condition for the accuracy of the meter—it is necessary to create a force opposite $F_R$ so that the resultant of this force is directly proportional to the flow. This result is generally achieved by the creation of a series of ribs or plateaus 11 on the bottom of cylindrical housing 1, as for example the star-shaped pattern of ribs shown in FIG. 2. In a system such as the one described, the flow within a housing 1 is divided, on the one hand, into a spiral current H on the inner periphery of the distributor or housing 1, (illustrated by the stippled areas of FIG. 4), and, on the other hand, into a central swirling zone M known as a Maelstrom zone.

The turbines used until now in multijet water meters comprise (see FIGS. 1 and 5), radially directed blades 12 arranged concentrically around a central hub 13 having rather large dimensions so as to desirably occupy a substantially large volume or portion of the Maelstrom zone and thus reduce the braking effect of that zone on the rotational energy of the blades. Because of this, there are frequently found serious disturbances in the hydraulic equilibrium as previously described, and the desired result in the fluid flow metering is not always achieved or is achieved in a very unstable manner, which, in both cases, makes the metrologic stability of the meter uncertain.

Referring now to FIGS. 6-14, the present invention comprises an improved turbine for use with cylindrical housings of the type described above and employed in conventional multi-jet fluid flow meters. FIGS. 6 and 8 illustrate a first embodiment of the invention in which turbine 14 unitarily comprises a thin disk 15 from which depend several blades 16, and at the center of which is dependingly formed an annular ring 17 in which a hollow rod 19 may be engaged for connection to the counting device of the meter (not shown) via ribs or splines carried by a shaft 18 of the rod. The central lug 8 of the distributor housing of FIG. 1 is insertably received in the hollow rod 19 for mounting turbine 14 on lug 8 in a manner analogous to the mounting of the conventional turbine 7 on lug 8. One variation of the turbine 14 of the present invention shown in FIG. 6 is illustrated in FIG. 9, in which the ring or bearing 17 is disposed above disk 15 projecting upwardly. Other variations of turbine 14 shown in FIG. 6 are illustrated in FIG. 10a and FIG. 10b in which the connecting shaft is formed integral with disk 15; in FIG. 10a, shaft 18 is secured to the upper side of disk 15 and extends upwardly while in FIG. 10b, shaft 18 is secured to the underside of disk 15 and projects downwardly. Most commonly, blade configuration 16, illustrated in FIGS. 6 and 8-10, is employed in the turbine of the present invention. However, other configurations more adapted to certain flows and/or to various types of fluid can be foreseen, are representatively shown, in a nonlimiting way, in FIGS. 7a to 7e.

In practice, the number of vertical blades under the arm or carrier disk can vary within reasonable limits. In the distributors of multi-jet meters currently used and referred to in FIGS. 1 to 5, turbines are equipped with seven blades for distributors having first and second arrays of ten holes each. According to a characteristics of the invention, the ratio between the number of holes and the number of blades is preferably a whole number; for example, only five blades (instead of seven) are provided for housings equipped with ten perforations in each lower and upper array for the input and output of the water.

Further, it has been found that in certain cases, the operation of this turbine can be further improved by altering its configuration. For example, the turbine according to the invention may be provided on its surface with means that make it possible to brake or slow its speed of rotation when very strong flows of fluid are involved.

In general, when such strong flow flows are involved, a blade-carrying disk has a tendency to race and in the past, it has been necessary to create, in some way, additional turbulences in the agitation zone of the fluid to slow down the movement of this disk.

According to one embodiment, illustrated in FIG. 12, disk 15 is advantageously pierced with holes 20 each of which are provided in the space between two blades 16.

According to another embodiment, the braking or slowing means can consist of ribs or projections located on the upper face of the disk at a location coinciding with each of the blades in a concentric fashion. According to yet another embodiment (shown in FIG. 14), ribs 22 are provided on the lower face of disk 15 as a radially inwardly directed extension of each blade. The combination of these two systems can also be provided as yet another embodiment.

The use of a new turbine, according to the invention, on a conventional distributor-housing (of the type in FIG. 1) makes it possible to regulate the flow of measured fluid and to approach or attain an ideal curve in the calculations of relative errors on the measurements of flows of meters known to date. In this regard, FIG. 11 illustrates the ordinary (5%) deviations or errors (E) or tolerated (2%) deviations or errors (E) in relation to the flow of water Q in a multi-jet meter at the levels of minimum flow (Q min), transition flow (Qt) and nominal flow (Qn). Curve A symbolizes the operation of a multi-jet meter of the prior art as described above. Curve B also illustrates the case of a meter of the same type where all the optimum adjustments have been made to reduce the margins of errors. Curve C, corresponding to a minimized margin of error, was obtained by using a turbine according to the invention, such as the one illustrated in FIG. 6. Further, by using a turbine designed according to the improvements of FIGS. 12 and 13-14, an accurate curve of measurement at the various flows can still be made linear, particularly in the case where it would normally rise rapidly for a very high fluid flow.

Of course, without going beyond the scope of the original idea of replacing the standard rotor with blades disposed around a central hub with a flat disk equipped with radial blades, other advantageous variant embodiments can be considered. For example, the thin disk can be installed in the median zone, rather than in the top, of the distributor housing the peripheral blades placed on both sides of the disk. Or two disks may be mounted parallel to one another and interconnected one to the other via, and made solid with, vertical blades. These two embodiments can also prove very advantageous in water meters of the type known as "single jet" meters.

It will be appreciated by those skilled in the art that various other changes may be made without departing from the scope of the invention, and the invention is not to be considered limited to that which is shown in the drawings and described in the specification.

What is claimed is:

1. A turbine for a multi-jet liquid meter of the type including a counter and a housing having a first array of openings in a lower wall portion and a second array of openings in an upper wall portion, the first array facilitating influx of liquid into the housing and the second array facilitating outflux of said liquid from said housing so that a flow of said liquid is generated in said housing, said turbine comprising:
 a thin horizontally disposed disk having a peripheral region and a central region, and wherein said disk includes means for slowing its speed of rotation during strong liquid flows;
 shaft means for rotatably supporting said plate means in said housing;
 and a plurality of blades supported perpendicular to, and only in the peripheral region of, said disk, for propelling said plate means in rotation in response to said liquid flow in said housing, said blades extending radially of said plate means;
 said shaft means including means for interconnecting said disk central region with said counter.

2. The turbine of claim 1, wherein said slowing means consist of perforations in said disk located between two adjacent blades.

3. The turbine of claim 1, wherein said slowing means consist of ribs disposed on the upper face of said disk and positioned above each of said blades.

4. The turbine of claim 1, wherein said slowing means consists of ribs disposed on the lower face of said disk and extending radially between each of said blades and said disk guide means.

5. A turbine for a multi-jet liquid meter of the type including a counter and a housing having a first array of openings in a lower wall portion and a second array of openings in an upper wall portion, the first array facilitating influx of liquid into the housing and the second array facilitating outflux of said liquid from said housing so that a flow of said liquid is generated in said housing, said turbine comprising:
 plate means;
 shaft means for rotatably supporting said plate means in said housing; and
 a plurality of blades supported by, and perpendicular to, said plate means, for propelling said plate means in rotation in response to said liquid flow in said housing,
 said blades extending radially of said plate means,
 said shaft means including means for interconnecting said plate means with said counter, and
 said plate means including means for slowing its speed of rotation during strong liquid flows.

6. The turbine of claim 5, wherein said slowing means consist of perforations in said plate means located between adjacent blades.

7. The turbine of claim 5, wherein said slowing means consist of ribs disposed on the upper surface of said plate means and positioned above each of said blades.

8. The turbine of claim 5, wherein said slowing means consist of ribs disposed on the lower surface of said plate means and extending radially between each of said blades and a central portion of said plate means.

* * * * *